(12) United States Patent
Morimoto (10) Patent No.: US 9,039,086 B2
(45) Date of Patent: May 26, 2015

(54) VEHICLE SEAT

(71) Applicant: TOYOTA BOSHOKU KABUSHIKI KAISHA, Aichi-ken (JP)

(72) Inventor: Takeshi Morimoto, Tajimi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 79 days.

(21) Appl. No.: 13/752,544

(22) Filed: Jan. 29, 2013

(65) Prior Publication Data

US 2013/0193731 A1 Aug. 1, 2013

(30) Foreign Application Priority Data

Feb. 1, 2012 (JP) ................................ 2012-019688

(51) Int. Cl.
*B60N 2/02* (2006.01)
*B60N 2/06* (2006.01)
*B60N 2/68* (2006.01)
*B60N 2/12* (2006.01)
*B60N 2/20* (2006.01)

(52) U.S. Cl.
CPC .. *B60N 2/06* (2013.01); *B60N 2/02* (2013.01); *B60N 2/682* (2013.01); *B60N 2/12* (2013.01); *B60N 2/20* (2013.01)

(58) Field of Classification Search
CPC ............... B60N 2/02; B60N 2/06; B60N 2/12
USPC .................................... 297/341, 378.1, 344.1
See application file for complete search history.

(56) References Cited

U.S. PATENT DOCUMENTS

| 4,822,101 | A | * | 4/1989 | Hosoe | 297/378.12 |
|---|---|---|---|---|---|
| 4,973,104 | A | * | 11/1990 | Nakayama et al. | 297/341 |
| 6,033,021 | A | * | 3/2000 | Udo et al. | 297/313 |
| 2004/0041454 | A1 | * | 3/2004 | Kepler | 297/354.12 |
| 2005/0082892 | A1 | * | 4/2005 | Yamada et al. | 297/367 |
| 2010/0244524 | A1 | * | 9/2010 | Kumazaki et al. | 297/341 |
| 2011/0049954 | A1 | | 3/2011 | Watanabe | |
| 2011/0127822 | A1 | * | 6/2011 | Moegling et al. | 297/378.12 |

FOREIGN PATENT DOCUMENTS

| CN | 101516671 | 8/2009 |
|---|---|---|
| CN | 101633330 | 1/2010 |
| DE | 3823090 | 4/1989 |

(Continued)

OTHER PUBLICATIONS

German Office action dated Apr. 17, 2014, along with an English-language translation thereof.

(Continued)

*Primary Examiner* — David R Dunn
*Assistant Examiner* — Jody Giacoman
(74) *Attorney, Agent, or Firm* — Greenblum & Bernstein, P.L.C.

(57) ABSTRACT

A vehicle seat includes a seat back, a seat cushion, a connecting arm that connects the seat back with the seat cushion, a seat arranging mechanism for changing the posture of the vehicle seat, and a fixing device. The seat arranging mechanism includes a base member at which the seat arranging mechanism is mounted to the connecting arm. The fixing device fixes the connecting arm to the seat cushion and also fixes the base member of the seat arranging mechanism to the seat cushion.

4 Claims, 7 Drawing Sheets

(56) References Cited

FOREIGN PATENT DOCUMENTS

| DE | 3906263 | 9/1989 |
|---|---|---|
| JP | 2007-112353 | 5/2007 |

OTHER PUBLICATIONS

Chinese Official Action for CN201310042539.9 dated Jan. 27, 2015, along with a partial English-language translation thereof.

* cited by examiner

VEHICLE SEAT

INCORPORATION BY REFERENCE

The disclosure of Japanese Patent Application No. 2012-019688 filed on Feb. 1, 2012 including the specification, drawings and abstract is incorporated herein by reference in its entirety.

BACKGROUND OF THE INVENTION

1. Field of the Invention

The invention relates to a vehicle seat in which a seat back and a seat cushion are connected via a connecting arm, and a base member of a seat arranging mechanism for changing the posture of the seat is mounted on the connecting arm.

2. Description of Related Art

A vehicle seat generally has a framework structure in which upper arms are respectively fixed to opposite lower portions of a seat-back frame, and lower arms are respectively fixed to opposite rear portions of a seat-cushion frame, while a reclining device is sandwiched between each of the upper arms and the corresponding lower arm. In the vehicle seat, a seat arranging mechanism, such as a walk-in mechanism or a tilt-down arrangement, for making a seat arrangement is often provided on the lower arm or seat-cushion frame in the framework structure of the seat. In a vehicle seat device as described in Japanese Patent Application Publication No. 2007-112353 (JP 2007-112353 A), a base member that supports the seat arranging mechanism is fixed to the lower arm.

The lower arm is originally provided for connecting the seat-back frame with the seat-cushion frame. Since extra space on a surface of the lower arm is small, it is difficult to provide a large mechanism, such as a seat arranging mechanism, on the lower arm, and restrictions are imposed on design of the seat arranging mechanism. In the seat device of JP 2007-112353 A, a base bracket for the seat arranging mechanism is divided into two members.

SUMMARY OF THE INVENTION

The invention provides a vehicle seat having a common fixing device for fixing a seat arranging mechanism in position and fixing a connecting arm, such as a lower arm, to a seat frame, wherein space on a surface of the connecting arm is not used for fixing the seat arranging mechanism, but effectively used for placing the seat arranging mechanism, so that restrictions on design of the seat arranging mechanism are reduced.

A vehicle seat according to one aspect of the invention includes a seat back, a seat cushion, a connecting arm that connects the seat back with the seat cushion, a seat arranging mechanism operable to change a posture of the vehicle seat, and a fixing device. The seat arranging mechanism includes a base member at which the seat arranging mechanism is mounted to the connecting arm. The fixing device fixes the connecting arm to the seat cushion and also fixes the base member of the seat arranging mechanism to the seat cushion. With this arrangement, the fixing device for fixing the connecting arm to the seat cushion is also used for fixing the base member of the seat arranging mechanism to the seat cushion; therefore, it becomes unnecessary to provide dedicated space for fixing the base member of the seat arranging mechanism on the surface of the connecting arm, and the seat arranging mechanism can be placed while making efficient use of space on the surface of the connecting arm. Consequently, space-related restrictions on design of the seat arranging mechanism can be reduced.

The vehicle seat according to the above aspect of the invention may further include a transmitting member that transmits an output of the seat arranging mechanism to another member in the seat. The fixing device may consist of a pair of fixing parts that are spaced apart from each other, and the base member may include a holding portion that holds the transmitting member and is located between the above-indicated pair of fixing parts. With this arrangement, since the holding portion of the transmitting member is located between the pair of fixing parts, variations or deviations of the holding position of the transmitting member from the design position can be reduced even if the positions of the pair of fixing parts are varied due to manufacturing variations. Namely, since the holding portion of the transmitting member is spaced apart from both of the pair of fixing parts, an influence of variations in the positions of the fixing parts can be reduced. As a result, an adverse influence due to variations in the holding position of the transmitting member, for example, a problem that it becomes difficult to connect the transmitting member with an output member of the seat arranging mechanism is less likely to occur.

The vehicle seat according to the above aspect of the invention may further include a reclining device that is mounted on one side of the connecting arm closer to the seat back, and is operable to recline the seat back. The seat arranging mechanism may be a walk-in mechanism operable to unlock a back-and-forth slide mechanism of the seat cushion and move the seat cushion forward, in association with forward tilting of the seat back. The walk-in mechanism may include an operating link mounted on the base member. The operating link may be operable to release the reclining device from a locked state in accordance with an operation of an operating member of the walk-in mechanism. The walk-in mechanism may include a kick link mounted on a center of rotation of the reclining device. The kick link may be adapted to be rotated with one end thereof abutting on an engaging piece on the seat back when the seat back tilts forward. One end of the transmitting member that is connected at the other end to the back-and-forth sliding mechanism may be coupled to a free end of the kick link. With this arrangement, the walk-in mechanism as the seat arranging mechanism can be designed with reduced restrictions concerning space; therefore, the magnitude of the required operating force of the operating member can be set with a high degree of freedom by suitably setting the link length of the operating link of the walk-in mechanism. Also, the holding portion of the transmitting member is provided on the base member, so that the kick link can be placed close to the walk-in mechanism, and the kick link and the walk-in mechanism can be assembled as a unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
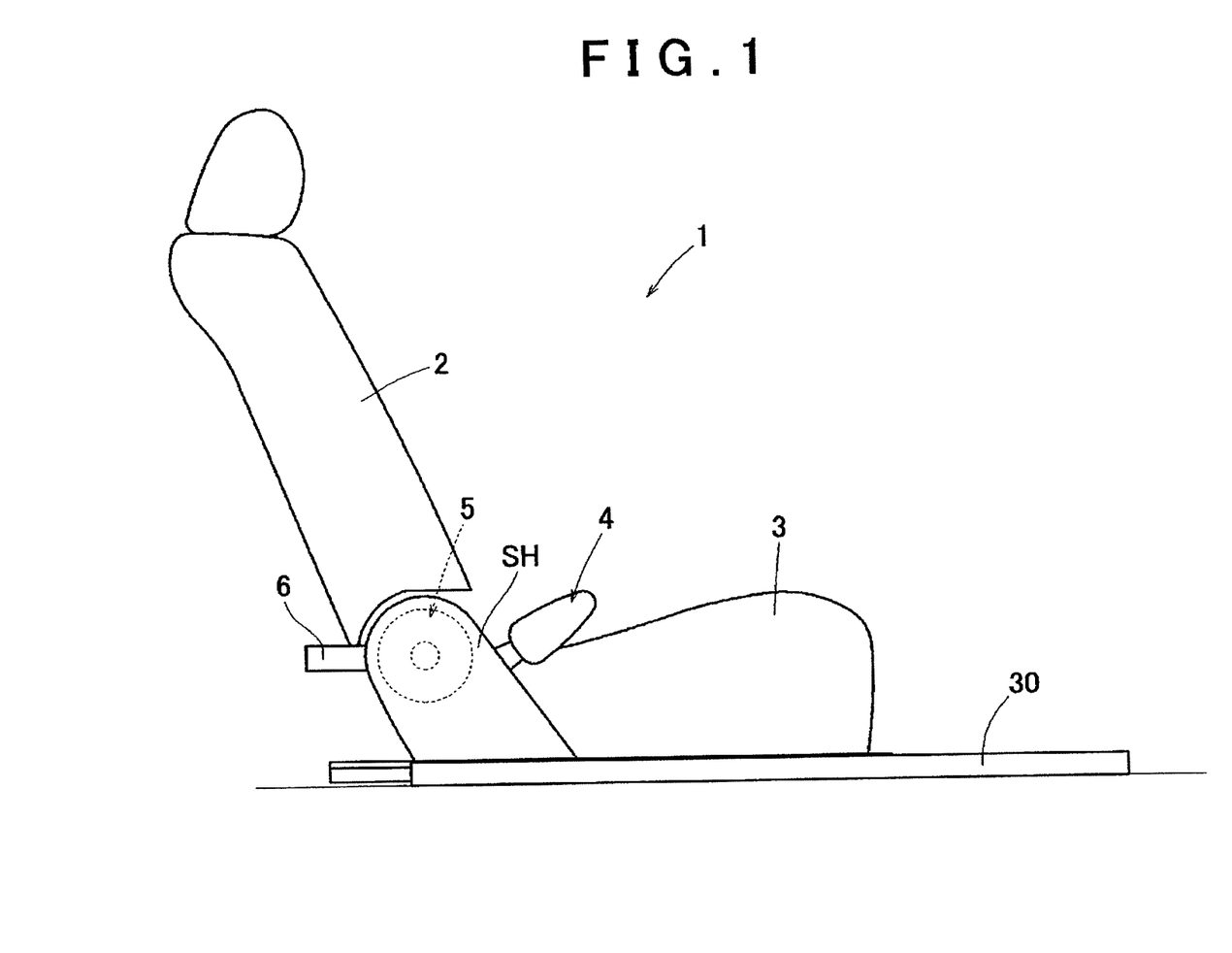
FIG. 1 is a side view of a vehicle seat according to one embodiment of the invention.
Figure 2:
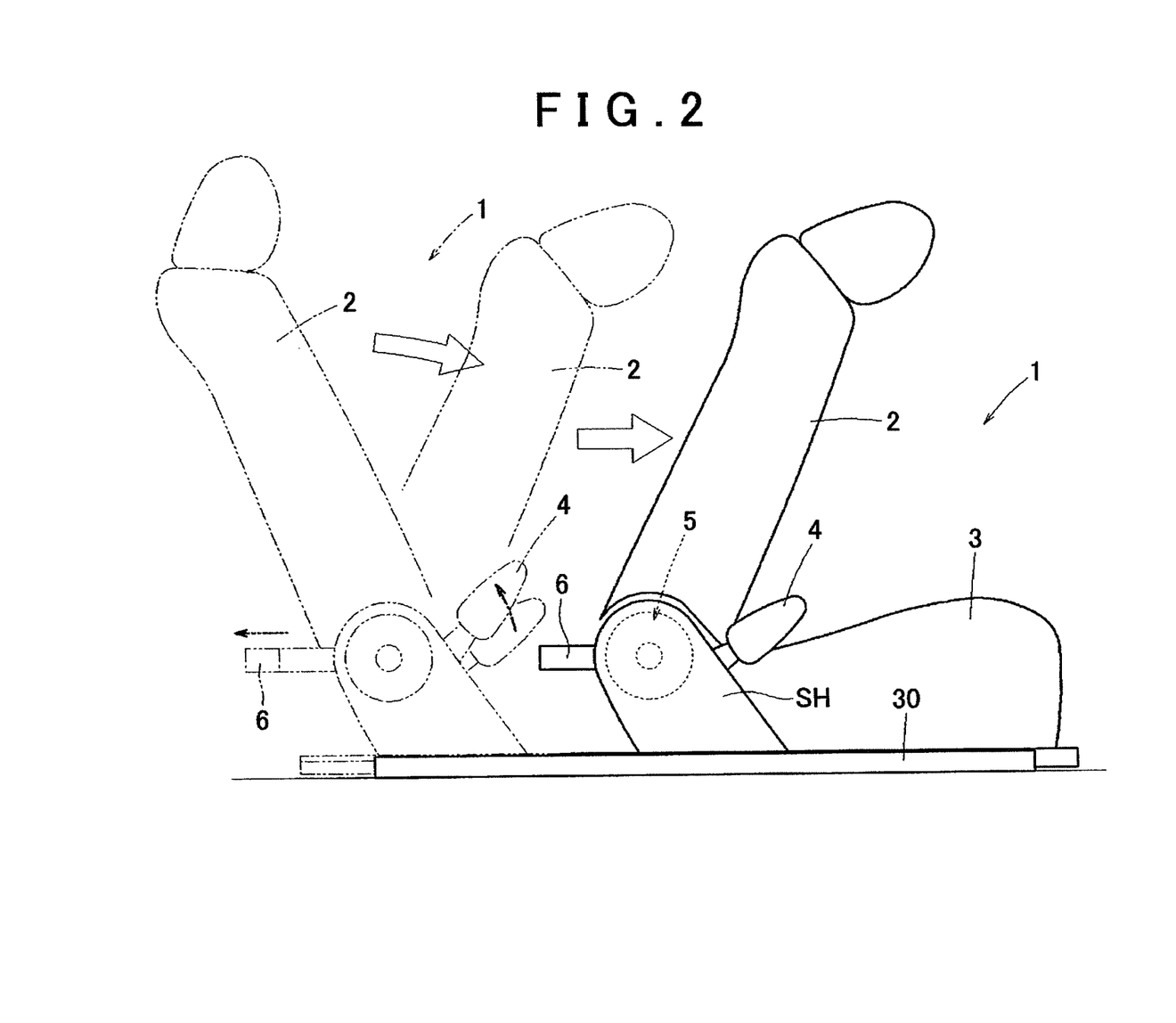
FIG. 2 is an explanatory view illustrating movements of the vehicle seat to a walk-in position in the embodiment of FIG. 1.

A vehicle seat as one embodiment of the invention is constructed as a second-row seat located behind a driver's seat of a vehicle having three rows of seats. As shown in FIG. 1, a seat body 1 includes a seat back 2 and a seat cushion 3. The seat body 1 is constructed as a so-called walk-in seat. As known in the art, when an operating lever 4 is operated to unlock a reclining device 5 interposed between the seat back 2 and the seat cushion 3, so as to tilt the seat back 2 forward, as shown in FIG. 2, a back-and-forth slide mechanism of the seat cushion 3 is unlocked in association with forward tilting of the seat back 2, and the seat cushion 3 is caused to slide forward. In FIG. 2, the movements of the operating lever 4 and the seat back 2 during the forward tilting and sliding movements of the seat are indicated by two-dot chain lines and arrows, and the position and posture of the seat body 1 upon completion of the forward tilting and sliding movements are indicated by solid lines. As shown in FIG. 1 and FIG. 2, an operating strap (operating member) 6 for causing the forward tilting and sliding movements, like the operating lever 4 for reclining, is provided at the rear side of the seat back 2. If the operating strap 6 is pulled backward as indicated by an arrow in FIG. 2, the reclining device 5 is unlocked via an operating link 7 (see FIG. 5) of a walk-in mechanism provided around the reclining device 5, so as to enable the seat body 1 to make the forward tilting and sliding movements as in the case where the operating lever 4 is operated. The operating strap 6 is provided for permitting a passenger seated in a third-row seat to easily perform an operation to make the forward tilting and sliding movements of a second-row seat when he/she gets off the vehicle.

Figure 5:
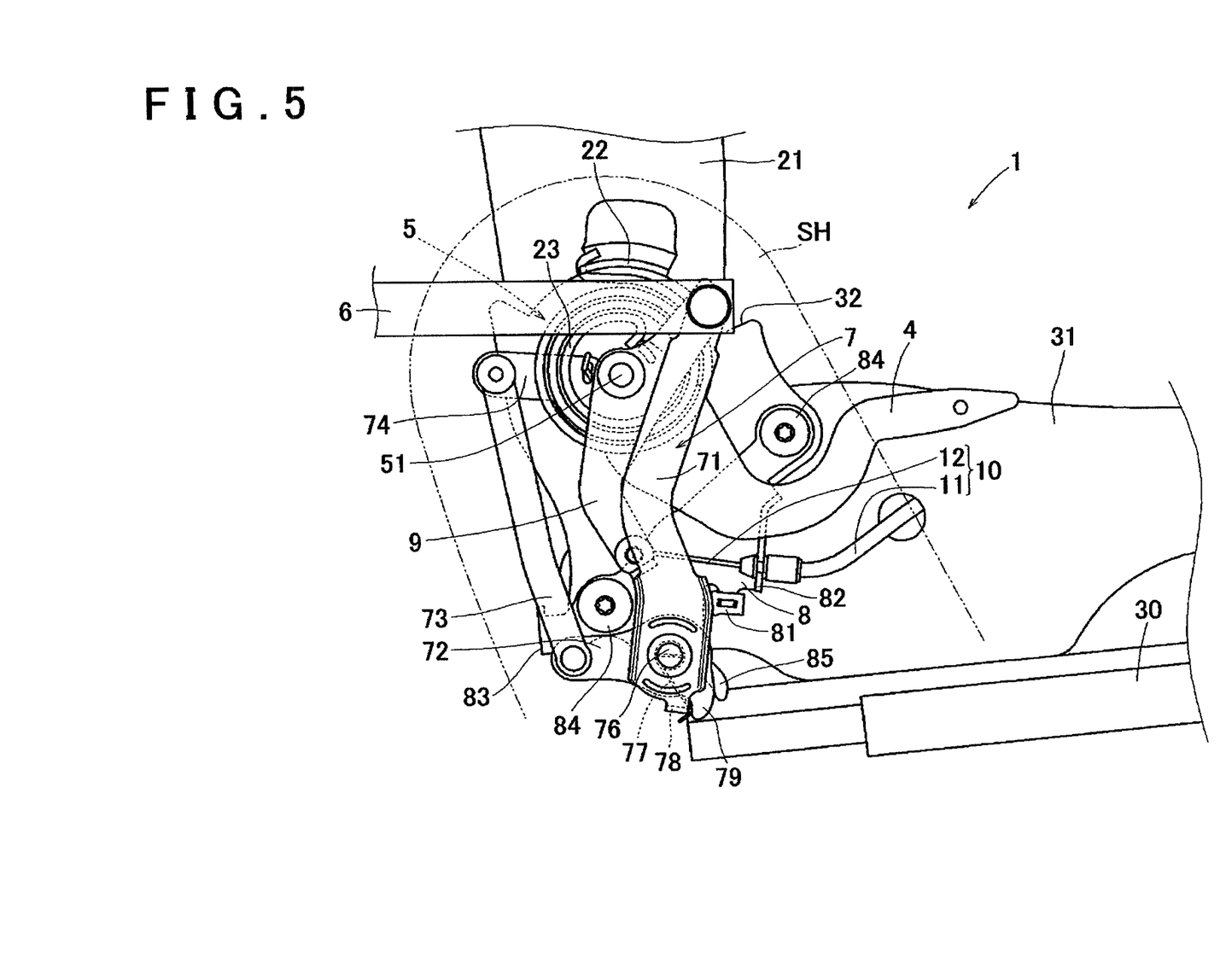
FIG. 5 is a side view of a principal portion of the embodiment of FIG. 1.
Figure 6:
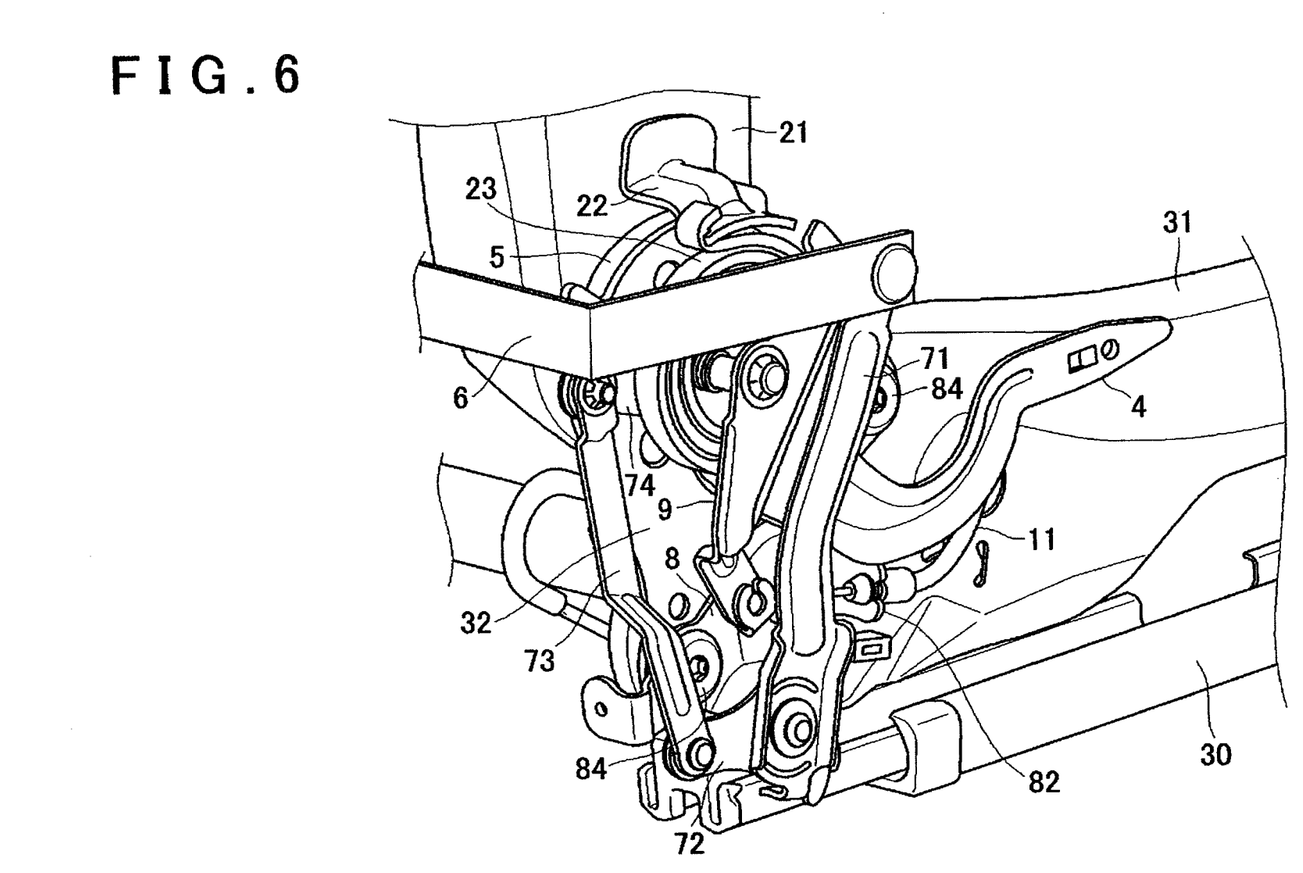
FIG. 6 is a perspective view of a principal portion of the embodiment of FIG. 1.
Figure 7:
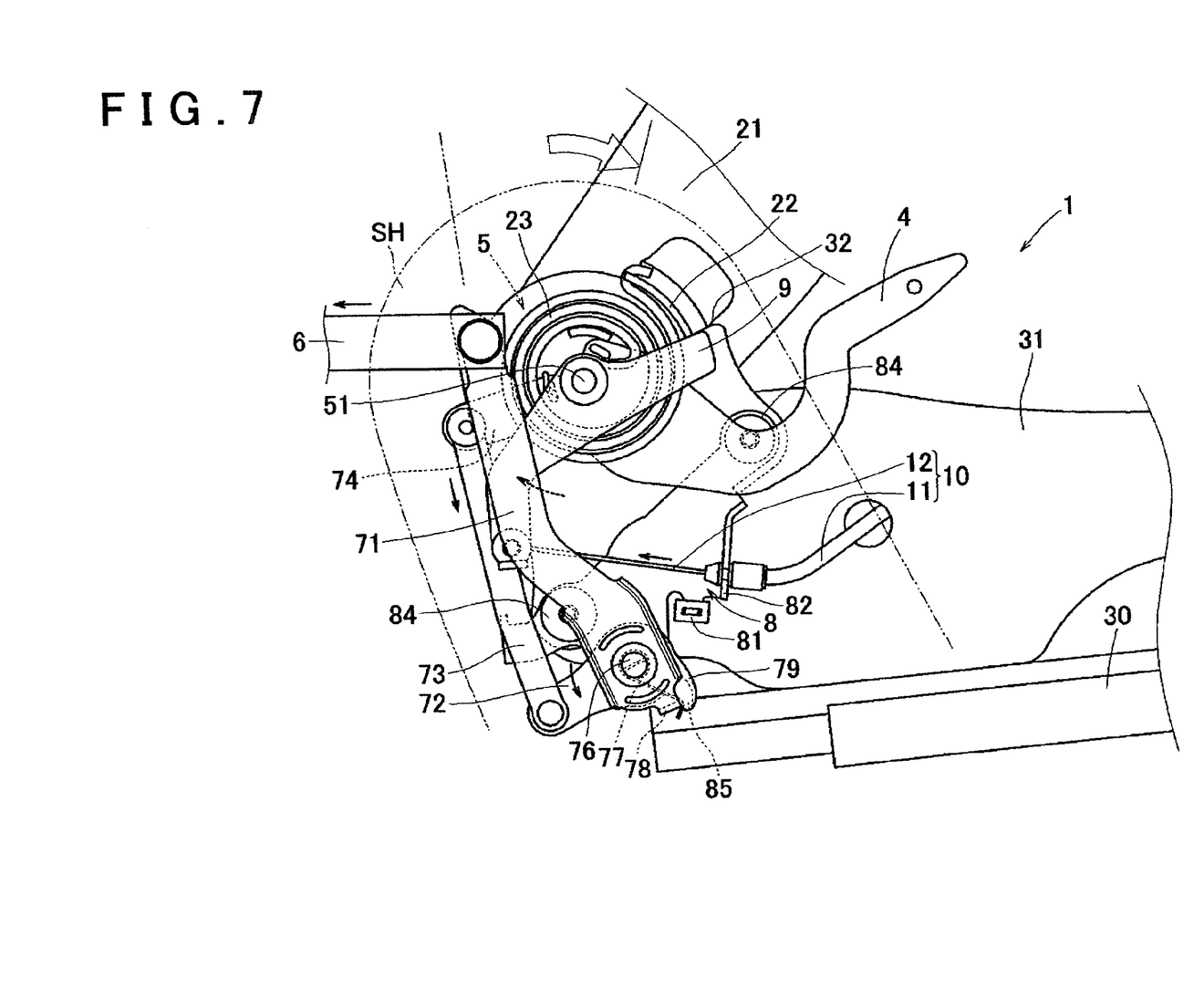
FIG. 7 is an explanatory view illustrating an operating condition of a principal portion of a walk-in mechanism in the embodiment of FIG. 1.

The construction of the seat around the operating link 7 of the walk-in mechanism will be described with reference to FIG. 3-FIG. 6. In FIG. 5 and FIG. 6, the construction of only the right-side rear portion of the seat body 1 to which the invention pertains is illustrated. A lower arm 32 that functions as a connecting arm is fixed to a rear portion of a seat-cushion frame 31 that forms a framework of the seat cushion 3, and an upper arm 21 is fixed to a lower portion of a seat-back frame (not shown). In this embodiment, the seat-back frame and the upper arm 21 are collectively called "seat back". The reclining device 5 is fixed between the lower arm 32 and the upper arm 21. When the reclining device 5 is in the unlocked position, the angle formed by the seat cushion 3 and the seat back 2 can be adjusted via the lower arm 32 and the upper arm 21. The operating link 7 of the walk-in mechanism is fixed to the lower arm 32. More specifically, a base member 8 that supports links 71-74 of the operating link 7 is fixed to the lower arm 32. While the lower arm 32 is fixed to the seat-cushion frame 31 by means of bolts 84, 84 that function as a pair of fixing parts, the base member 8 is also fixed, along with the lower arm 32, to the seat-cushion frame 31. Accordingly, there is no need to separately fix the lower arm 32 to the seat-cushion frame 31, and fix the base member 8 to the seat-cushion frame 31, but the lower arm 32 and the base member 8 are fixed together to the seat-cushion frame 31, by means of the bolts 84, 84. In other words, the bolts 84, 84 serve to fix the base member 8 to the lower arm 32, and also fix the lower arm 32 to the seat-cushion frame 31. Two links 71, 72 of the operating link 7 are fixed to the base member 8 such that the links 71, 72 are rotatable as a unit, and the link 73 is connected to the other end of the link 72. Further, the link 74 is connected to the other end of the link 73, and an unlocking operation shaft (not shown) of the reclining device 5 is coupled to the other end of the link 74. On the other hand, the operating strap 6 is coupled to the other end of the link 71. When the operating strap 6 is pulled in the direction of the arrow in FIG. 7, the link 71 is rotated in the counterclockwise direction about its lower end fixed to the base member 8, and the link 73 is moved downward via the link 72. Therefore, the link 74 is rotated in the counterclockwise direction, so that the reclining device 5 is unlocked in the same manner as when the operating lever 4 is operated. Force is transmitted from the link 71 to the link 72 when a kick piece 78 that protrudes from the lower end of the link 71 is pressed against a leg piece 79 that protrudes from one end portion of the link 72. On the other hand, even if the link 72 is rotated in the counterclockwise direction in FIG. 5 via the links 74, 73 through operation of the operating lever 4, the leg piece 79 is not pressed against the kick piece 78; therefore, the rotation of the link 72 is not transmitted to the link 71, and the link 71 is not rotated. If the reclining device 5 is unlocked, and the seat back 2 is tilted forward, and an engaging piece 22 fixed to the upper arm 21 abuts on and presses the upper end of a kick link 9. As a result, the kick link 9 is rotated in the clockwise direction as shown in FIG. 7, about the center 51 of rotation of the reclining device 5, and an inner cable 12 of a cable 10 that functions as a transmitting member connected to the lower end of the kick link 9 is pulled in the direction of an arrow in FIG. 7. An outer case 11 of the cable 10 is held by a holding portion 82 of the base member 8, and the outer case 11 is adapted to operate an unlocking piece (not shown) of the back-and-forward slide mechanism (not shown) to which the other end of the inner cable 12 is connected.

Figure 3:
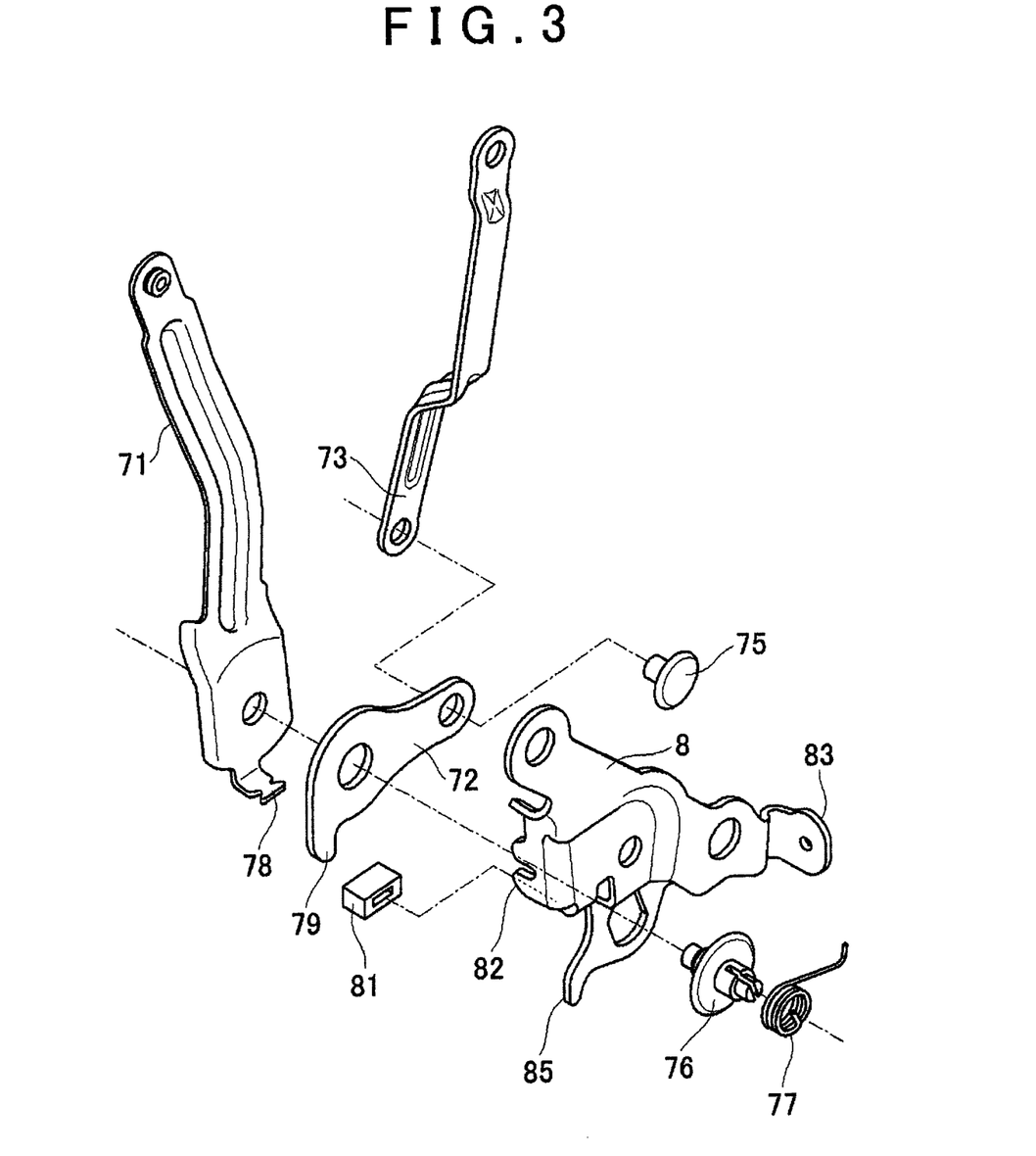
FIG. 3 is an exploded perspective view of a principal portion of the embodiment of FIG. 1.
Figure 4:
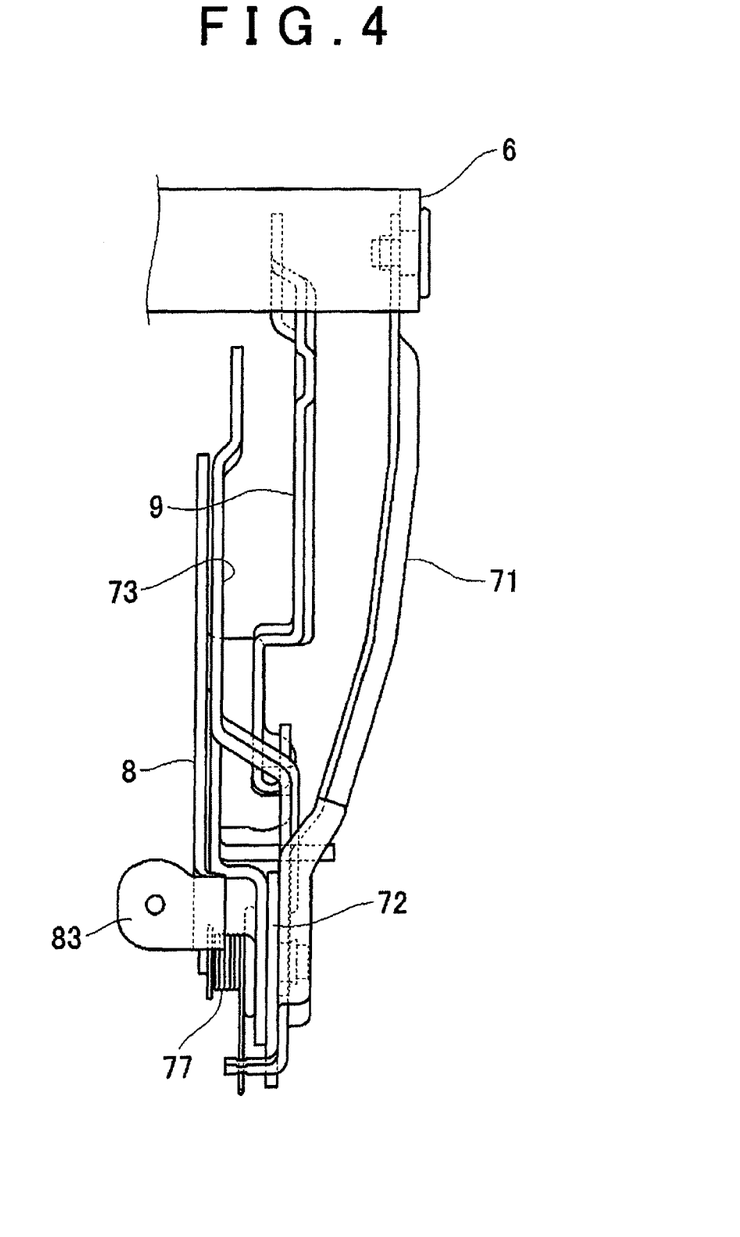
FIG. 4 is a front view of a principal portion of the embodiment of FIG. 1.

In FIG. 3 and FIG. 5, a spiral spring 23 biases the seat back 2 in such a direction as to tilt the seat back 2 forward. A connecting pin 75 fixes the links 72, 73 such that the links 72, 73 are rotatable. A connecting pin 76 fixes the links 71, 72 such that the links 71, 72 are rotatable relative to the base member 8. A torsion spring 77 has one end fitted in a slot of the connecting pin 76, and the other end that engages with the kick piece 78 of the link 71. A shield fixing bracket 83 is in abutting contact with a fixing portion (not shown) formed on the inner side of a shield SH, and the shield fixing bracket 83 and the fixing portion are fixed to each other by a bolt (not shown), so that the shield SH is fixed. A stopper piece 85 formed on the base member 8 is located so as to interfere with the kick piece 78 of the link 71. When the link 71 is largely operated, the kick piece 78 abuts on the stopper piece 85, so that the link 71 is prevented from being further operated. A stopper rubber 81 is provided on the base member 8. When no operating force is applied from the operating strap 6 to the link 71, a side portion of the link 71 abuts on the stopper rubber 81 so that the link 71 is stopped. At this time, the stopper rubber 81 functions as a cushioning or shock-absorbing material, and suppresses sound that would be generated when the link 71 is returned under the bias force of the torsion spring 77.

According to the above embodiment, since the base member 8 of the operating link 7 of the walk-in mechanism, as well as the lower arm 32, is fixed by the bolts 84, 84 for fixing the lower arm 32 to the seat-cushion frame 31, dedicated space for fixing the base member 8 of the operating link 7 of the walk-in mechanism need not be provided on the surface of the lower arm 32, and the operating link 7 of the walk-in mechanism can be placed while making effective use of space on the surface of the lower arm 32. Further, space-related restrictions on design of the operating link 7 of the walk-in mechanism can be reduced. Since the holding portion 82 of the cable 10 is located between the pair of bolts 84, 84, variations or deviations of the holding position of the cable 10 from the design position can be reduced even if the positions of the bolts 84, 84 are varied due to manufacturing variations. Namely, since the holding portion 82 of the cable 10 is spaced apart from both of the bolts 84, 84, an influence of variations in the positions of the bolts 84, 84 can be reduced. As a result, an adverse influence due to variations in the holding position of the cable 10, for example, a problem that it becomes difficult to connect the cable 10 with the kick link 9 as an output member of the walk-in mechanism, is less likely to occur. In addition, since the walk-in mechanism can be designed with reduced restrictions in terms of space, the magnitude of the required operating force of the operating strap 6 can be set with an increased degree of freedom, by suitably setting the link length of the operating link 7 of the walk-in mechanism. Also, since the holding portion 82 of the cable 10 is provided on the base member 8, the kick link 9 can be placed close to the operating link 7 of the walk-in mechanism, and the kick link 9 and the operating link 7 can be assembled as a unit. In the case of this embodiment, the link 71 is curved outward as viewed in the width direction of the seat body 1, and the kick link 9 is placed between the links 71, 73, so that the links 71-74 of the operating link 7 do not interfere with the kick link 9 (see FIG. 4). The link 71 is curved along the shape of the inside of the shield SH (see FIGS. 1, 5, 7).

The present invention is not limited to the appearance and construction as described above in the illustrated embodiment, but various changes, additions, and deletions may be made without changing the principle of the invention. For example, the seat arranging mechanism is not limited to the walk-in mechanism, but may be a tilt-down mechanism with which the seat cushion sinks down to be stored in position as the seat back tilts forward, or a tip-up mechanism with which the seat cushion is rotated about a rear portion thereof, and is stored along the front side of the seat back. The fixing device is not limited to the bolts, but may be rivets, or the like. The transmitting member is not limited to the cable, but may be a transmission link that connects link members so that the output of the seat arranging mechanism is transmitted to another member in the seat.

What is claimed is:

1. A vehicle seat, comprising:
   a seat back;
   a seat cushion;
   a connecting arm that connects the seat back with the seat cushion; and
   a walk-in mechanism operable to unlock the seat cushion from a locked position and move the seat cushion forward, in association with forward tilting of the seat back, the walk-in mechanism including:
   a base member mounted to the connecting arm;
   an operating link mounted on the base member, the operating link being operable to release a reclining device from a locked state in accordance with an operation of an operating member; and
   a kick link mounted on a center of rotation of the reclining device, the kick link being adapted to be rotated with one end thereof abutting on an engaging piece on the seat back when the seat back is tilted forward; and
   a fixing device that fixes the connecting arm to the seat cushion and also fixes the base member to the seat cushion.

2. The vehicle seat according to claim 1, further comprising a transmitting member that transmits an output of the walk-in mechanism to move the seat cushion, wherein
   the fixing device comprises a pair of fixing parts that are spaced apart from each other, such that one of the pair of fixing parts fixes the connecting arm to the seat cushion and the other of the pair of fixing parts fixes the base member to the seat cushion,
   the base member includes a holding portion that holds the transmitting member, and
   the holding portion is located between said pair of fixing parts.

3. The vehicle seat according to claim 2, wherein
   the reclining device mounted on one side of the connecting arm closer to the seat back and operable to recline the seat back, and
   one end of the transmitting member is coupled to a free end of the kick link such that when the kick link is rotated the transmitting member unlocks the seat cushion.

4. The vehicle seat according to claim 1, wherein
   the operating link includes a first link, a second link, a third link and a fourth link,
   a first end of the first link is connected to the operating member,
   a second end of the first link is fixed to a first end of the second link such that the first link and the second link are fixed together at the base member and rotatable as a unit,
   a second end of the second link is connected to a first end of the third link,
   a second end of the third link is connected to a first end of the fourth link, and
   a second end of the fourth link is coupled to the reclining device, and
   when the operating member is actuated, the first link and the second link are rotated in a counter clockwise direction, the third link is moved downwardly, the fourth link rotates in the counter clockwise direction so as to unlock the reclining device, and the kick link is rotated clockwise about the center of rotation of the reclining device.

* * * * *